March 31, 1953 W. T. LIVERMORE 2,633,035
AUTOMATIC FLUID PRESSURE TRANSMISSION
Filed June 8, 1944
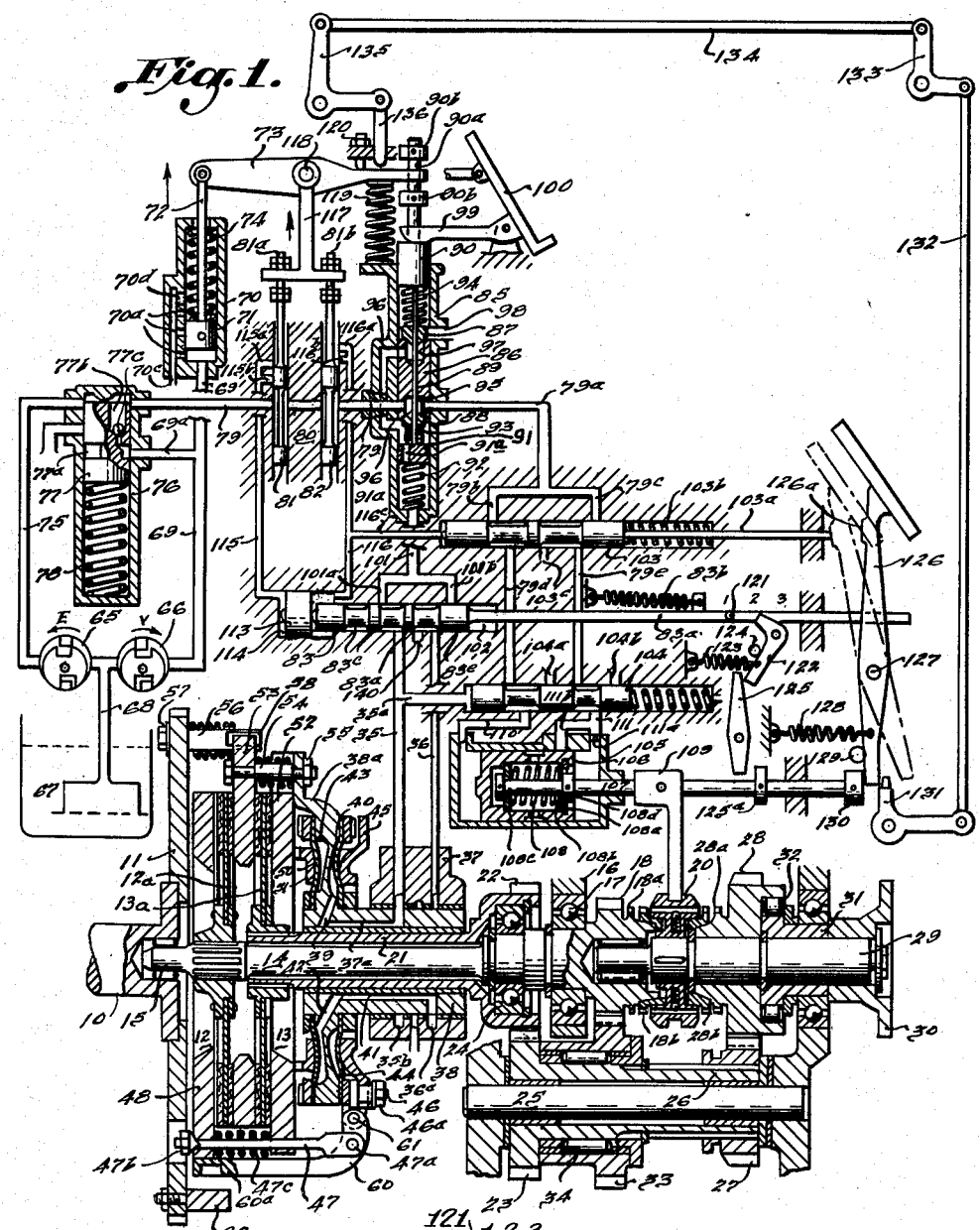
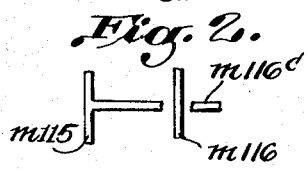
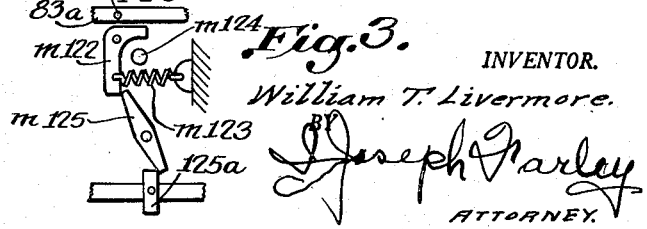
INVENTOR.
William T. Livermore.
Joseph Farley
ATTORNEY.

Patented Mar. 31, 1953

2,633,035

UNITED STATES PATENT OFFICE 2,633,035

AUTOMATIC FLUID PRESSURE TRANSMISSION

William T. Livermore, Grosse Pointe Farms, Mich.

Application June 8, 1944, Serial No. 539,259

28 Claims. (Cl. 74—472)

This invention relates to automatic transmissions particularly designed for automotive vehicles. In my prior United States Letters Patent Nos. 2,120,104 granted June 7, 1938 and 2,376,545 granted May 22, 1945, is disclosed an automatic transmission of the broad general type in which a plurality of gear trains of different gear ratio is provided and in which the gear trains of different ratio are rendered operative or effective at any particular instant by the automatic engagement of one of a plurality of fluid pressure actuated clutches under the combined effect of vehicle speed and throttle opening. In said patents the effect of vehicle speed is made operative upon the automatic control mechanism through the medium of a speed governor and suitable connections therefrom to a floating main control lever of differential effect.

One of the principal objects of the present invention is to provide a new and improved automatic transmission of the broad general type disclosed in my above-mentioned patents and to include therein the floating lever of differential effect and in which the control mechanism is made responsive to variations in vehicle and engine speeds through the medium of a pair of fluid pressure pumps, one driven at engine speed and the other driven at vehicle speed and so that fluid under pressure delivered to the control system may come either from the engine driven pump or vehicle driven pump.

In any automatic transmission particularly designed for automotive vehicles it is highly important that a change from one gear ratio to another gear ratio be effected as smoothly as possible to avoid objectionable jerking effects. I have accomplished this in prior constructions, such for example as disclosed in my aforementioned patent No. 2,376,545 and my co-pending application Serial No. 504,548 filed October 1, 1943, by the use of various control means for the admission of fluid pressure to the clutches so arranged that the rate of flow of the fluid under pressure to and from the clutch applying devices is such that there would be a certain amount of overlap of the period of engagement of the respective clutches, so that, for example, when passing from low gear to second speed, engagement of the clutch for second gear takes place shortly before the low gear clutch is completely disengaged. In accordance with the present invention free wheeling units are employed in, what may be termed, the transmission gearing proper so that when one clutch is caused to be engaged to transfer the drive to a different gear ratio from a lower gear ratio which immediately preceded, and which had been effective through a different clutch, the objectionable jerking effects which might otherwise be present are entirely eliminated by the presence of the free wheeling units in the gearing, the gears of lower ratio retaining the drive to the propeller shaft until the higher speed gear takes over the drive and by the overrunning effect inherent in the free wheeling unit, gradually releases the gears of the lower gear ratio.

Another object of the present invention is to provide a new and improved construction for an automatic transmission, particularly of the fluid pressure clutch type, wherein clutch engagements are effected under the combined influence of speed through centrifugal force and pressure of the fluid being delivered to the clutch for the purpose of actuating it.

A further object is to provide a new and improved construction for a clutch housing and a transmission mounting and connections between them whereby the clutch housing and transmission will be automatically self-aligning to compensate not only for variations in manufacturing tolerances, but also for variations due to wear.

Another object is to provide a new and improved, but simplified, construction of manually operated means for connecting the transmission in operative relationship with the vehicle and engine so that the latter, irrespective of the setting of the automatic controls at any instant, may be employed as a brake when the vehicle is descending steep hills or so that the motion of the vehicle may be used for starting the engine.

The above and other objects of the invention will appear more fully from the following more detailed description and by reference to the accompanying drawing forming a part hereof wherein Fig. 1 is a somewhat diagrammatic view of a transmission constructed in accordance with the principles of the present invention and Figs. 2 and 3 respectively are fragmentary modifications of certain fluid passages and an interlock device shown in Fig. 1 adapted to modify the operation of a shiftable synchronizer unit.

As shown in the drawing the numeral 10 may be considered as representing the end of the shaft of an internal combustion engine of an automotive vehicle and the numeral 11 the lateral web of the flywheel of the engine which is suitably secured to the shaft 10. Carried by the flywheel web 11 or other similar face plate for rotation therewith is a pair of clutches 12, 13 presently to be more fully described. For the present it will be sufficient to state that clutch 12 is secured upon, and in driving relationship with, a stub shaft 14, one end of which is piloted, as indicated at 15, within the end of the engine shaft 10. The shaft 14 passes through a wall 16 of a transmission housing, or casing, and is supported by an anti-friction bearing 17 therein. Within the interior of the transmission housing the shaft 14 terminates in a driving gear 18 and clutch gear 18–a adapted to be engaged by the internal gear teeth of a synchronizer sleeve 20, a gear blocking ring 18–b, in accordance with the usual construction of synchronizers of the type shown, being interposed between the clutch gear teeth 18–a and the synchronizer sleeve 20 and being frictionally mounted upon the extreme inner end of the shaft 14.

The clutch 13 is keyed upon one end of a sleeve 21, the other end of which terminates in an enlarged head, the outer periphery of which is formed as a gear 22, the teeth of which mesh with a gear 23. The enlarged end of the sleeve 21 is counterbored for the reception of an anti-friction bearing 24 interposed between said head and the shaft 14. Gear 23 is rotatably supported upon a countershaft 25 and is formed integrally with a sleeve 26 upon which is slidably, but non-rotatably, mounted a gear 27. The teeth of the gear 27 are normally in mesh with the teeth of a gear 28 which is rotatably mounted upon a propeller shaft 29 having a flanged coupling member 30 secured thereto for suitable connection to the main driving shaft (not shown) of the vehicle. Gear 28, like gear 18, is also provided with clutch gear teeth 28–a for engagement by the internal gear teeth of the synchronizer sleeve 20, a gear tooth blocking ring 28–b, similar in construction and function to the ring 18–b, being interposed between the synchronizer sleeve 20 and the gear 28. Free wheeling means are interposed between gear 28 and the shaft 29 and such means consist of a sleeve 31 keyed to shaft 29; locking rollers 32 being mounted between the sleeve 31 and the interior of a counterbore formed in the gear 28, all in accordance with any of the well-known constructions of devices of this character.

Mounted upon the sleeve 26 that projects laterally from gear 23 is a gear 33, free wheeling locking rollers 34 being interposed between the bore of gear 33 and the periphery of sleeve 26.

As will be seen from the foregoing construction when clutch 12 is engaged drive will be transmitted from the engine shaft through shaft 14 to gear 18 from whence it will be transmitted, when the parts are in the position shown in the drawing with the synchronizer sleeve 20 in its neutral position, through gear 33 and free wheeling unit 34 to sleeve 26 and thence through gears 27 and 28, free wheeling unit 32 and sleeve 31 to shaft 29 to effect low, or first gear drive.

Assuming that first gear drive has been established, if then the clutch 13 is engaged, drive will then be effected through the sleeve 21 and gears 22, 23 to the sleeve 26 from whence it will be delivered through gear 27 to the gear 28 and free wheeling unit 32 to shaft 29 and even though clutch 12 remains in engagement, the provision of the free wheeling unit or locking rollers 34 between sleeve 26 and gear 33 insures that drive will be effected through gears 22 and 23, the driving of sleeve 26 at the higher speed through gears 22 and 23 serving to declutch or unlock the locking rollers 34.

The engagement of clutches 12 and 13 is preferably effected by means of fluid under pressure delivered under the control of automatic control devices presently to be more fully described, through either of the conduits 35 or 36. These conduits are connected to a collector ring 37 in which is rotatably received the extended hub 38 of a diaphragm carrying plate 38–a. The conduit 35 communicates through an annular conduit 35–b with a conduit 37–a extending longitudinally of the hub 38 and which communicates through a branch 39 with a pressure chamber 40 formed between the lateral plate 38–a and a diaphragm 44 carried thereby. The conduit 36 communicates through an annular branch 36–a with a similar longitudinally extending conduit 41 which in turn communicates through a branch 42 with a pressure chamber 43 formed between the plate 38–a and a diaphragm 50 also carried by said plate 38–a.

When fluid under pressure is delivered into the pressure chamber 40 such pressure is exerted against the inner face of the diaphragm 44 to move said diaphragm towards the right in the drawing and exert pressure on a pressure ring 45, through which passes a plurality of studs 46 secured within the plate 38–b and which serve to secure the diaphragms 44, 50 to said plate. As shown, a slight clearance is left between the pressure ring 45 and the nuts 46–a on studs 46. Connecting bolts 47 connect the pressure ring 45 to a clutch applying plate 48 so that under certain conditions hereinafter to be more fully described the plate 48 will be moved towards the right and to cause clutch 12 to be engaged. The slight degree of movement required to take up the clearance between the pressure ring 45 and nuts 46–a is not, however, sufficient to cause effective clutch engagement of clutch 12. When fluid under pressure is admitted into the pressure chamber 43 it exerts pressure upon diaphragm 50 tending to move said diaphragm towards the left and by exerting pressure on the ring 51 move the clutch applying plate 52 towards the left and engage clutch 13 by squeezing the plates thereof between the clutch applying plate 52 and a clutch backing plate 53. A plurality of shouldered studs 54 pass through suitable apertures provided in the plate 38–a and the clutch backing plate 53, nuts 55 serving to clamp the clutch backing plate 53 and the plate 38–a against shoulders provided on the studs 54 to hold the plates 53 and 38–a in fixed spaced relationship to each other. Secured at spaced intervals around the lateral web 11 of the flywheel 11 is a plurality of shouldered studs 56 which are clamped securely thereto by the nuts 57. Each of these studs 56 terminate at their inner ends in flattened portions 58 which pass freely into suitable slots provided about the periphery of the clutch backing plate 53.

The engagement of the studs 56 within the slots of the clutch backing plate 53 forms a driving connection between said plate and the web 11 of the flywheel and as the flywheel is secured to the engine shaft 10, the backing plate 53 will therefore be driven at engine speed. The connection formed by the studs 54 between the backing plate 53, the clutch applying plate 52 and the diaphragm carrying member 38–a will likewise cause both of the latter to be driven at engine speed. It will be noted that the hub 38 is of substantial length and that it is rotatably supported upon the sleeve 21 which in turn is carried at its right hand end by the shaft 14, through the anti-friction bearing 24 interposed between the enlarged end of the sleeve 21 and the shaft 14 thus serving to hold this end of shaft 14 and sleeve 21 in accurate concentric relationship. The connection afforded by the studs 54 between the plate 38-a and the clutch backing plate 53 in effect unites the clutch backing plate 53 to the members 38, 38-a to form therewith a unitary structure but as the connection between the backing plate 53 and the flywheel 11 by the engagement of the flattened portion 58 of the studs 56 within the slots of the plate 53, permits a relative tilting movement between the flywheel 11 and the unitary structure consisting of the members 38, 38-a and the backing plate 53, it will be seen that the parts will be self-compensating, not only for variations in manufacturing tolerances but also for wear.

When friction clutches are employed for transmission of power, and particularly when such clutches are used in an automobile, it is important that means be provided for varying the amount of pressure used for engaging the clutches. For example, if a uniform clutch pressure is employed that would be sufficiently high to prevent clutch slippage at relatively high torques, the application or engagement of the clutch with such a high pressure when starting the vehicle or shifting with light torque would result in a very objectionable jerk; would throw undue strains upon the driving gears, propeller and axle shafts and, in many cases, would result in immediate stalling of the engine. If the clutch pressure were maintained uniform, but sufficiently low to prevent the objectionable effects just mentioned, excessive clutch slippage would inevitably occur at high torques with resulting excessive wear upon the clutch plate surfaces and objectionable heating effects.

When an automobile is equipped with a conventional clutch pedal for manual engagement of the clutch, the skillful driver engages the clutch to such a degree as to permit a certain amount of clutch slippage and thereby avoids the objectionable jerking effect. To simulate this manual graduation of pressure in an automatic transmission, and particularly when clutch engagement is effected by fluid pressure, it becomes highly important and desirable to have the pressure for clutch engagement varied in accordance with engine torque, or throttle opening which is an indicator thereof. This is effected in the present invention by the following means: The pressure ring 45 which, as heretofore described, is secured to the diaphragm carrying plate 38-a by the studs 46, carries a plurality of weights 60 which are pivotally secured at one end to the pressure ring 45 as at 61, the other end 60-a of each weight being free. The connecting bolts 47 hereinbefore referred to, are pivotally connected as at 47-a to the weights 60 and said bolts pass through suitable apertures in the clutch applying plates 48 and 52; and adjusting nut 47-b being threaded onto the end of each connecting bolt 47 for engagement with the plate 48 and a spring 47-c being confined between the plates 48 and 52.

It will be seen from the foregoing description, and by reference to the drawing, that the springs 47-c will tend to move the plate 48 towards the face plate 11 and will exert pressure upon the connecting rods 47, which through their pivotal connection at 47-a to the weights 60 will tend to normally hold the free ends 60-a of the weights 60 against the outer periphery of the plate 48.

As the clutch assembly is rotated, the centrifugal forces will tend to move the free ends 60-a of the weights 60 outwardly. This will also tend to cause the nuts 47-b to exert a pressure upon the clutch backing plate 48 and move it away from the flywheel 11, or towards the right in the drawing, thus tending to engage the clutch 12. As soon as the nuts 47-b come into contacting engagement with the clutch plate 48, the pivotal connection 47-a of the bolts 47 with the weights 60 will then act as a fulcrum for the weights 60 which will then, if there is no fluid under pressure within the pressure chamber 40, tend to cause them to move the pressure ring 45 towards the left distorting the diaphragm 44 in the same direction until the weights 60 reach the stops 62. Therefore the outward movement of the weights 60 will merely result in distorting the diaphragm 44, and plate 48 will not be moved to the left far enough to apply clutch 12. If, however, there is fluid pressure within chamber 40, it will react against diaphragm 44 and tend to prevent distortion thereof. This will then cause the pins 61 instead of the pivotal connection 47-a to act as fulcrums for the weights 60 as they are moved outwardly by the centrifugal force, thus pulling bolts 47 and plate 48 to the right against the springs 47-c and, thereby applying clutch 12. If the fluid pressure is sufficient to hold plate 45 against nuts 46-a, the pressure on clutch 12, due to the centrifugal force of the weights 60, will increase as the engine speed is increased until finally it causes a clutch drag to be exerted that is great enough to prevent further increase in engine speed. As the fluid pressure delivered to the clutch increases with the extent of throttle opening, as will hereinafter be more fully described, the greater the throttle opening the higher will be the engine speed at which this clutch drag will occur. Therefore, for each particular throttle opening there will be a corresponding speed at which the pressure will be sufficient to prevent any further increase in speed. The pressure is thus automatically self-adjusted to throttle opening. The power thus transmitted through the clutch will start the vehicle in motion, and as its speed increases, the clutch member 12-a will finally run as fast as the engine, and clutch slipping then ceases. As the speed of the vehicle and the engine continues to increase, the centrifugal force mounts rapidly, thus preventing any further tendency to slip.

As a result of the above described construction, the advantage of a soft gradual initial clutch engagement by hydraulic pressure is obtained while the advantage of varying the effective clutch pressure in accordance with engine speed by centrifugal means is also utilized.

It will, of course, be understood that hydraulic pressure may also be applied at idling speeds in which case the weights would be held by the release springs from causing centrifugal engagement until the engine speed is increased. The starting action is then controlled entirely by centrifugal force in which case the hydraulic action would be used only to release the clutches for shifting.

It will further be understood that, depending on the strength of the springs 47-c the weights 60 may move outwardly to engage the stops 62 as soon as the engine is started and reaches idling speed, but such movement of the weights would not be sufficient to apply the clutch, when therefore fluid under pressure is admitted to the chamber 40 and the diaphragm 44, the clutch engagement is affected hydraulically by distortion of the diaphragm which simultaneously causes the weights 60 to be moved inwardly and away from the stop 62.

Under these conditions, therefore, the weights 60 then occupy a position in which they are "cocked," as it were, to be immediately responsive to speed fluctuations.

The stops 62 provided for the weights 60 serve to limit the amount of clutch pressure that can be exerted as the result of centrifugal force, otherwise the centrifugal forces might result in the production of stresses that would be destructive at high speeds. It will be seen from the foregoing that the combination of both hydraulic pressure and centrifugal force are required to impart enough movement to plate 48 to cause engagement of the clutch 12.

If fluid under pressure exists in the pressure chamber 43, such pressure tends to move the pressure ring 51 towards the left to exert pressure on the clutch applying plate 52, thus causing the engagement of the clutch 13. As the clutch 13 is used in the present transmission, for second speed drive, and as the conditions with respect to clutch pressures in making a shift from first to second, or from high or direct drive to second gear are not as critical as the clutch pressures that are required in starting the vehicle from rest or in driving at high speeds in direct drive, the clutch pressures employed for application and engagement of the clutch 13 are uninfluenced by the centrifugal effects of the weights 60; variation in the clutch pressures employed for clutch 13 being merely those which result from the functioning of a pressure control valve, presently to be described, which is regulated in accordance with the extent of throttle opening.

Fluid under pressure is supplied to the transmission of the present invention from either, or both, of the pumps 65 and 66, the pump 65 being driven from the engine in accordance with engine speed and the pump 66 having drive imparted to it from beyond the transmission so that it is driven in accordance with vehicle speed and can act as a speed governor. Each of these pumps draw fluid from a sump 67; a common intake conduit 68 connecting both pumps with said sump. The outlet of the vehicle speed pump 66 is connected to a conduit 69 which leads to a cylinder 70 in which is slidably mounted a piston 71. The piston 71 is connected by a piston rod 72 with one end of a floating differential lever 73, a spring 74 being mounted within the cylinder 70 and confined between the upper end of said cylinder and the piston 71 so as to normally urge the piston 71 towards the lower end of the cylinder 70.

The outlet of the engine driven pump 65 is connected by a conduit 75 to the upper end of an accumulator cylinder 76 in which is slidably mounted a piston 77, a spring 78 in said cylinder serving to normally urge the piston 77 towards the upper end of the cylinder to a position such as shown in the drawing. The piston 77 is provided with an annular groove 77-a which, when the piston is in the position shown, is in alignment with a branch 69-a of conduit 69. Communication between the annular groove 77-a and the upper face of the piston 77 is effected through a by-pass conduit 77-b under the control of a ball check valve 77-c.

When the engine is started and with the vehicle at rest, fluid under pressure from the engine pump 65 flows through conduit 75 to the upper end of the cylinder 76. Pressure of the fluid in the upper part of the cylinder obviously will cause the ball check valve 77-c to be seated and prevent any flow of the fluid through the conduit 77-b. As the pressure builds up within the upper end of the cylinder 76, the piston 77 will be forced downwardly against the pressure of the accumulator spring 78. Fluid will then pass from the accumulator through the conduit 79 to a pilot valve casing 80 where it communicates with the chamber associated with the intermediate necked portion of each of the pilot valves 81, 82 and is available, under the control of such pilot valves to be directed to the fluid pressure means for operating the main selector valve 83.

When the accumulator pressure has reached the amount required for clutch operation the groove 77-a will no longer be in registry with branch conduit 69-a so that the vehicle driven pump may deliver fluid at greater pressure to the cylinder 70 and thereby act through the rod 72 as a vehicle speed responsive member or governor on the left hand side of the differential lever 73.

When the vehicle has been set in motion and the pump 66 is actuated to withdraw fluid from the sump 67 and deliver it through the conduit 69, none of such fluid will pass through the conduit 77-b as long as the fluid being delivered by the engine pump 65 is at a greater pressure than the fluid being delivered by the vehicle pump. Nor will any of such fluid pass through said conduit 77-b after the accumulator pressure reaches the desired amount and groove 77-a is cut off. As the speed of the vehicle increases, more fluid will be delivered by the vehicle pump 66, thus tending to raise the piston 71 against the pressure of the spring 74 and successively uncovering the ports 70-a provided in the wall of the cylinder 70 and which serve to connect the interior of the cylinder 70 with the conduit 70-c which leads to the sump. At its upper end the conduit 70-c communicates with the interior of the cylinder through a relief port 70-d of much greater area than the ports 70-a so that when the piston 71 has been forced upwardly a sufficient amount to uncover the port 70-d it serves to prevent any further build-up of pressure within the cylinder 70 and to limit the extent of upward movement of the left hand end of the floating lever 73.

As it is important that the pressure of the fluid being delivered to actuate the clutches 12 and 13 be varied in accordance with the extent of throttle opening which is to a certain extent indicative of the driving torque which the engine is called upon to deliver, a pressure control valve 85 is provided. This valve is provided with a fixed sleeve 86 having valve seats at either end thereof with which are engaged the mushroom-shaped valve plugs 87, 88. The valve plugs 87, 88 are slidably mounted upon a push rod 89 the upper end of which abuts against an actuating plug 90 which fits slidably within the casing of the valve 85 while the lower end of the push rod 89 abuts against a plug 91 mounted within the lower part of the valve casing. A spring 92 confined between the lower end of the casing of the valve 85 and the plug 91 normally serves to hold said plug in contact with the push rod 89 and to hold the upper end of the push rod in engagement with the plug 90. A spring 93 confined between slidable plug 91 and the valve plug 88 normally serves to hold the latter in its closed, or seated, position while a similar spring 94 is confined between the valve plug 87 and the sliding plug 90 to normally hold the valve plug 87 seated.

Fluid under pressure is delivered through the conduit 79 and through the pilot valve casing 80 uninterrupted by the pilot valves 81, 82 to the pressure control valve 85 where it is delivered to a chamber 95. This chamber 95 communicates, when the valve plug 88 is opened, with one end of a by-pass conduit 96 which, at its other end, communicates with a valve chamber 97 similar to the valve chamber 95 and which is normally closed by the valve plug 87. When the valve plug 87 is unseated, the fluid passing through the by-pass conduit 96 is permitted to flow to a conduit 98 which connects to the sump.

The slidable plug 90 provided in the upper end of the valve body 85 is adapted to be actuated by a lever arm 99 secured to, and projecting from, the accelerator pedal 100. The sliding block 91 located in the lower portion of the valve 85 is provided with a hole 91-a for permitting fluid under pressure which passes the valve plug 88 to pass from the conduit 96 into the lower part of the valve 85 and thence through a conduit 101 to the branches 101-a and 101-b to flow to the chamber 102 of the selector valve 83.

Fluid under pressure within the conduit 79 leading from the accumulator 76 is also adapted to pass through the pressure control valve 85 from chamber 95 thereof to a conduit 79-a from which it may pass through the branches 79-b and 79-c to a synchronizer valve 103 to be directed thereby through the conduits 79-d or 79-e to a synchronizer interlock or safety valve 104 from which the fluid under pressure may pass to the cylinder 105 of a synchronizer operating unit. Slidably mounted within the cylinder 105 is a piston 106 to which is connected a piston rod 107, the connection between piston rod 107 and the piston 106 being a resilient spring connection formed by the spring 108 which is confined between a pair of washers 108-a, 108-b located at one end of said piston and a washer 108-c at the other end thereof. The upper end of a shifter fork 109 is pinned, or otherwise suitably secured, to the piston rod 107; the lower forked end of the shifter fork engaging within a groove provided in the sliding sleeve 20 of the synchronizer unit in accordance with the usual construction of devices of this character. The chamber of synchronizer valve 103 is provided with an outlet 103-c which communicates with the sump while the chamber of the synchronizer safety valve 104 is provided with similar outlets or conduits 104-a, 104-b which also lead to the sump. Communication between the safety valve 104 and the cylinder 105 is effected through the conduit 110 which leads to the left hand side of the cylinder 105 or through the conduit 111 having one branch terminating in a restricted inlet 111-a at the extreme right hand end of the cylinder 105 or through a larger inlet 111-b which communicates with the cylinder 105 at an intermediate point.

The selector valve 83 is provided with a valve rod 83-a, a spring 83-b being connected to the rod 83-a to normally hold the selector valve 83 towards the left in the position shown in the drawing and with the left hand end of the valve in contact with a piston plug 113 slidably mounted within an enlarged chamber 114 which communicates with the end of the selector valve chamber 102. The left hand end of the chamber 114 communicates through a conduit 115 having branches 115-a and 115-b which lead to the chamber within which the pilot valve 81 is mounted and the other, or right hand end of the chamber 114 is in communication with a conduit 116 having at its other end the branches 116-a and 116-b which communicate with the valve chamber in which the pilot valve 82 is slidably mounted. The pilot valves 81 and 82 are adjustably connected with a lost motion connection by the valve rods 81-a and 81-b with a lower cross web of a connecting rod 117, the upper end of which is pivotally connected as at 118 substantially to the central part of the floating lever 73. At its right hand end the differential lever 73 is slotted, or forked, to embrace a rod 90-a that is secured to the sliding plug 90 of the pressure control valve 85, the end of the differential lever 73 normally being located substantially midway between a pair of stop collars 90-b secured to the said rod 90-a. A spring 119 confined between the upper face of the casing of valve 85 and the right hand end of the differential lever normally holds said lever in contact with an adjustable stop 120.

The rod 83-a of the selector valve 83 has a pin 121 projecting laterally from it which pin is adapted to engage with the upper end of a pivoted stop 122 which is normally held by a spring 123 against a stop pin 124 with the upper end of the pivoted stop 122 in position to be engaged by the pin 121. The lower end of the pivoted stop 122 is adapted to be engaged by the upper end of a pivoted lever 125, the lower end of which lies in the path of movement of the shifter fork 109.

As it is frequently necessary, or desirable, to provide means whereby a manual shift of an automatic transmission may be made for the purpose of using the engine as a brake in descending a steep hill or when it is desired to start the engine by towing the car, the following means are provided: A foot pedal 126 pivotally mounted, as at 127, is normally held in the full line position shown in the drawing by means of a spring 128 with the lower end of the pedal in engagement with a stop 129. In this position of the foot pedal 126 the lower end thereof abuts against a collar 130 secured to the right hand end of the piston rod 107 of the synchronizer operating piston. Pivotally mounted adjacent to the collar 130 is a bell crank lever 131 connected by a rod 132, lever 133 and rod 134 to one arm of a bell crank lever 135 from the other arm of which a push rod 136 is pivotally supported. Also located upon the piston rod 107 adjacent to the lower end of the lever 125 is a collar 125-a.

The upper end of the foot pedal 126 is provided with an abutment 126-a which is adapted to engage the end of the valve rod 103-a of synchronizer valve 103, valve 103 being normally held by the spring 103-b towards the left hand side of its valve chamber.

The manner in which the transmission operates is as follows: If the engine and vehicle are at rest, all of the parts are in the positions shown in the drawing. If the engine is started the engine pump 65 is rotated to deliver fluid under pressure through conduit 75 to the upper part of the cylinder 76 thereby depressing piston 77 to permit fluid under pressure to flow across the top of the cylinder above said piston and through the conduit 79 to the pressure control valve 85. As the accelerator pedal 100 is depressed, the rod or lever 99 formed integral therewith will force the sliding plug 90 downwardly and cause the push rod 89 to force the sliding plug 91 downwardly against the action of spring 92. This will serve to tend to release the pressure upon spring 93 so that as the pressure builds up under the influence of the accumulator, the mushroom valve plug 88 will be lowered from its seat, thus permitting fluid under pressure to flow from the chamber 95 to the conduit 96. As the accelerator pedal is thus depressed, the spring 94 which seats against the valve plug 87 is compressed, thus tending to hold the valve 87 more firmly on its seat. Fluid in the conduit 96, the pressure of which will therefore increase with the extent of throttle opening, will flow through the lead line 91-a in the sliding plug 91 and out through the bottom of the valve 85 through conduit 101 to the branches 101-a, 101-b thereof. With the valves in the position shown in the drawing, fluid passes from branch 101-a across to the conduit 35 from whence it flows to the longitudinal conduit 37-a in the member 38 and through conduit 39 to the pressure chamber 40, thus forcing the diaphragm 44 and pressure ring 45 to the right until the lost motion between pressure ring and nuts 46-a is taken up and ring 45 engages nuts 46-a. An amount of depression of the accelerator pedal sufficient to open the pressure control valve as above described will also result in a speeding up of the engine sufficient to cause the weights 60 to come into action so that the combined effect of the centrifugal force and pressure will cause clutch 12 to be engaged. Low gear drive is then effected through the shaft 14, gears 18, 33 and free wheeling unit 34 to the sleeve 26 and gears 27 and 28, through the free wheeling unit 32 to the propeller shaft 29, thus placing the vehicle in motion.

As the vehicle starts in motion, rotation is imparted to the vehicle driven pump 66 which delivers fluid under pressure through the conduit 69 to the cylinder 70, thus causing the piston 71 therein to be raised against the action of the spring 74. This movement of the piston 74 is communicated through the piston rod 72 to the differential lever 73 thus tending to raise the latter. As the speed of the vehicle increases and more fluid is delivered by the vehicle pump 66, upward movement of the differential lever 73 causes the pilot valve 81 to be raised sufficiently to bring the branch 115-b in communication with the necked portion of pilot valve 81, thus establishing communication between the fluid under pressure flowing through the conduit 79 and the conduit 115. Pressure of the fluid within conduit 115 is exerted upon the left hand side of the piston plug 113 within chamber 114 thereby moving the piston 113 to the right and moving the selector valve 83 to the right against the action of the spring 83-b. When the piston plug 113 reaches the end of its travel within the cylinder 114 the selector valve cuts off the communication between the branch 101-a and the conduit 35 and places conduit 35 in communication with the conduit 140 which leads to the sump. When this occurs, the pin 121 that projects from the valve rod 83-a of valve 83 contacts with the upper end of the pivoted stop 122 and prevents further movement of the selector valve towards the right. As the opening of conduit 140 is restricted, fluid under pressure in conduit 35 drains slowly to the sump. At the same time the enlarged portion 83-e of the valve at the right hand end will uncover the end of the branch passage 101-b so that fluid under pressure may pass around the right hand necked portion of the valve 83 to the conduit 36 and to the pressure chamber 43 to engage the clutch 13.

When the fluid under pressure is admitted to the conduit 36 to engage clutch 13, drive will then be effected through the sleeve 21 and gear 22 to gear 23 and thence through the sleeve 26 and gears 27, 28 through the free wheeling unit 32 to the propeller shaft 29.

It will be apparent that when the drive is thus effected the free wheeling unit 34 is automatically released, or unlocked, by the fact that drive is imparted to the sleeve 26 in such a direction and at such a speed as to unlock the locking rollers 34. Clutch 12, however, is not disengaged immediately upon the engagement of clutch 13, but its disengagement is retarded by the restriction in the conduit 140.

As the speed of the car increases, the differential lever 73 will be raised still farther until the necked portion of the pilot valve 82 comes into communication with the branch conduit 116-b thus permitting the fluid to pass from the main fluid supply conduit 79 to conduit 116, to urge the selector valve further towards the right. Further movement of the selector valve, however, towards the right is prevented by the engagement of the locking pin 121 with the pivoted locking lever 122. The pressure within the line 116, therefore, in effect backs up through the branch 116-c and moves the synchronizer valve 103 towards the right thus cutting off communication from conduit 79-b to conduit 79-d, establishing communication between conduit 79-c and 79-e and shutting off the communication between 79-e and conduit 103-c which leads to the sump and connecting conduit 79-d with 103-a to the sump. With the valves 103 and 104 in the position shown in the drawing the fluid would pass from conduit 79-d across the left hand necked portion of valve 104 to conduit 110 and thence to the left hand end of cylinder 105 and thereby tending to hold piston 106 in the position shown with the collar 130 on the end of piston rod 107 in engagement with the lower end of foot pedal 126. In the meantime, however, as fluid under pressure has been delivered through the conduit 35 to actuate clutch 12 for first gear drive, the pressure of this fluid is therefore communicated through branch 35-a to the left hand end of the safety or interlock valve 104 moving it towards the right to cut off the flow of fluid from conduit 79-d to conduit 110. After the flow of fluid has been cut off to conduit 35, and the pressure in said conduit has dropped sufficiently to release clutch 12 and the car has speeded up sufficiently to operate the selector valve to the high speed position, the fluid under pressure will then flow into the right hand side of cylinder 105 to cause piston 106 to move to the left and cause the synchronizer sleeve 20 to be moved to the left, the piston 106 moving slowly at first due to the restriction 111-a of the orifice in conduit 111 and while compressing spring 108, so that when proper synchronization occurs between synchronizer sleeve 20 and gear 18, the synchronizer sleeve will snap quickly into engagement with the clutch gear teeth 18-a. When a synchronizer unit of the type shown is shifted to engage the sleeve 20, for example, with the clutch gear teeth 18-a the first action is to force the internal cone surface of the gear blocking ring 18-b into engagement with the cooperating external cone surface provided on gear 18, these cone surfaces acting as a friction clutch to cause the gear 18 to be rotated, the speed of rotation of the gear gradually increasing until when it is synchronized with the speed of the sleeve 20, the internal teeth of sleeve 20 slide easily into mesh with the clutch gear teeth 18-a without clashing. In view of these characteristics of such synchronizers, it is desirable to have the action of the cylinder 105 and piston 106 graduated or varied so that during those portions of the synchronizer sleeve's travel where engagement of the friction cone surfaces are taking place to effect synchronization, the sleeve will travel more slowly than at the beginning or end of its movement. This is accomplished by the provision of the restricted orifice in conduit 111-a in combination with the spring connection 108 between the piston 106 and piston rod 107, the restricted orifice permitting only a slow rate of flow of fluid to the cylinder 105 during the time the friction surfaces are being engaged and during which time the spring 108 is being compressed and, after the parts are brought to the same speed, the spring causing the sleeve to be snapped quickly into engagement with the teeth 18-a.

Conditions are then established for high or direct gear drive, so that when the synchronizer actuating means has moved the synchronizer sleeve 20 to the left to engage with gear 18, the collar 125-a on piston rod 107 engages the lower end of lever 125 moving it in a clockwise direction, as viewed in the drawing, to cause the upper end thereof to move the lower end of the locking lever 122 in a counterclockwise direction and thereby withdraw the upper end thereof out of engagement with the locking pin 121. The pressure of the fluid admitted through branch conduit 116 into the chamber 114, therefore, is now able to move the selector valve 83 to the extreme right hand limit of its travel. This causes communication to be re-established between the branch conduit 101-a and conduit 35 through the extreme left hand necked portion of valve 83, shuts off the flow of fluid under pressure to the conduit 36 and connects it to the conduit 140 which leads to the sump, thus disengaging clutch 13 and by re-establishing communication of the fluid under pressure to the conduit 35 causing clutch 12 to be re-engaged. Direct drive is then established through shaft 14, gear 18 and synchronizer unit 20 direct to the propeller shaft 29.

It will be seen that with the above arrangement the synchronizer piston is moved to its left hand position for engaging the collar 20 with the jaw teeth 18-a of gear 18 only after the pilot valve 82 has moved to an open position for admitting pressure to conduit 116 thereby initiating the establishment of third or high gear drive, and that upon the return of the pilot valve 82 to a closed or exhaust position, the release of pressure in conduits 116 and 116-c will cause the synchronizer valve 103 to return to the position shown in the drawing as well as to cause the selector valve 83 to return to its intermediate position for exhausting pressure from conduit 35 and admitting pressure to conduit 36. Accordingly, when the pressure in conduit 35 and 35-a drops sufficiently to permit the safety valve 104 to return to the position shown in the drawing, the synchronizer piston 106 and collar 20 will be moved to neutral position and clutch 13 will be engaged for second gear drive. In effect, the synchronizer unit is thereby normally retained in its neutral position during first and second gear drives and in its operative left hand position during high or direct drive.

However, it may be desirable to cause the synchronizer unit to be shifted to its left hand operative position upon the establishment of second gear drive and remain in such position during downshifts from third to second gear drive in order that shifts most frequently encountered during normal operation may be effected without movement of the synchronizer unit and merely by the alternate engagement and disengagement of the respective clutches 12, 13. This type of operation may be obtained by connecting the conduit 116-c with conduit 115 associated with pilot valve 81 instead of conduit 116 associated with pilot valve 82.

With this alternative arrangement, first gear drive will be established as described above; second gear drive will be established upon the opening of pilot valve 81 to admit pressure to conduit 115, the movement of the selector valve 83 to its intermediate position and the admission of clutch engaging pressure to conduit 36, the synchronizer unit being shifted to its left hand operative position as soon as pressure is released from conduit 35; and third gear drive will be established upon the opening of pilot valve 82, and the movement of the selector valve 83 to its right hand position as shown in the drawing for re-admitting pressure to conduit 35 and exhausting pressure from conduit 36.

Reversal of the position of pilot valve 82 and movement of the selector valve 83 for effecting engagement of one or the other of clutches 12, 13 will thereupon be ineffective to change the position of the synchronizer collar 20 and shifts from second to third or third to second gear drive will be rendered effective merely by the release of one clutch and application of the other without movement of the synchronizer collar 20. With such alternative arrangement the synchronizer unit will be returned to its neutral position as shown in the drawing only after pilot valve 81 has moved to an exhaust position and pressure in conduit 115 is exhausted permitting the synchronizer valve 103 to return to its left hand position as shown in the drawing.

By adapting the interlock lever 122 and stop 121 to block the return movement of the selector valve 83 from its intermediate second gear position to its left hand first gear position until the synchronizer unit has reached its neutral position, the possibility may be avoided of first gear clutch pressure being prematurely admitted to conduits 35 and 35-a and the safety valve 104 being prematurely moved to its right hand position for blocking the admission of actuating pressure to the synchronizer piston 106.

Fig. 3 shows interlock levers $m-122$ and $m-124$ as well as spring $m-123$ and stop pin $m-124$ modified to provide the action described above while Fig. 2 shows fluid passage connections $m-116-c$ modified for such action. In both such Figs. 2 and 3, the modified elements have been numbered to correspond with like elements of Fig. 1, with a prefix "$m$" added to each.

If, when the car is running in high or direct drive, it should be desired to employ the engine as a brake for descending a steep hill, pedal 126 is depressed to the dotted line position shown in the drawing. This will cause the synchronizer valve 103 to be moved to the extreme left hand position shown in the drawing, thus causing fluid under pressure to flow to the left hand side of the cylinder 105 forcing piston 106 to the right and shifting the synchronizer sleeve 20 to the right into engagement with the teeth 28-a of gear 28. Obviously the lower end of pedal 126, which formerly acted as a limit stop to prevent movement of the synchronizer, will be swung by the depression of the pedal to the right and out of engagement with the collar 130 on the end of piston rod 107 to permit this movement of the piston 106.

As it is necessary that fluid under pressure be admitted to clutch 13 in order to make the second speed drive effective, when lever 126 is depressed, the lower end thereof engages with the bell crank lever 131 to cause the pin 136 to be depressed through the bell crank levers 133, 135 and connecting rods 132, 134, thus causing the floating lever 73 to be depressed to cause the right hand end thereof to engage the collar 90-b and actuate the fluid pressure control valve thereby to insure the passage of fluid under pressure to the conduit 191, and at the same time to move the pilot valves 81 and 82 downwardly so that pilot valve 82 cuts off the flow of fluid to the branch conduit 116 and thus permits the selector valve to be moved towards the left to shut off the flow of fluid under pressure to the conduit 35 and pressure chamber 40 to release clutch 12 and to place the selector valve in position such that the fluid under pressure may then flow through conduit 36 to pressure chamber 43 and hold clutch 13 in engagement.

If it is desired to start the engine of the vehicle by towing the vehicle, the pedal lever 126 may also be depressed to accomplish this function, the pedal functioning to establish the fluid pressure connections just described.

As the overrunning clutch 32 is a one way clutch device, it would not, of course, be capable of imparting drive backwardly from the vehicle to the engine. Therefore, in order to make second speed drive effective to use the engine as a brake or to start the vehicle by towing it, it is necessary to engage the synchronizer unit 20 with the gear teeth 28-a of the gear 28 thereby to connect the propeller shaft 29 directly to the gear 28 so that the engine may be driven by the movement of the vehicle.

When the floating lever 73 is depressed by the manual actuation of the foot pedal 126 and the bell cranks and connecting rods 131 to 135 and pin 136 to cause the pilot valve 82 to be depressed or when the floating lever 73 is caused to be depressed by the action of the spring 74 due to a drop of pressure of the fluid pumped by the fluid pump 66 when the speed of the vehicle decreases, the depression of valve 82 will first uncover the branch conduit 116-a thus permitting fluid in the conduit 116 and the chamber 114 to pass into the chamber in which valve 82 is mounted and around the valve stem 81-b to flow out the upper end of the valve casing 80 and to the sump. The same likewise occurs when the valve 81 is depressed and the branch conduit 115-a is uncovered. In each case the selector valve will be moved towards the left by the action of the spring 83-b as soon as the pressure of the fluid in the selector valve chamber 114 on either side of the piston plug 113 is relieved by the opening of the conduits 116-a, 116-b or 115-a, 115-b.

From the foregoing description, it will be apparent that because of the presence of the free wheeling units 32 and 34, engagement of the clutch 13 may occur without release of the clutch 12, for as soon as the clutch 13 takes hold, the increased speed of rotation of the sleeve 26 merely releases the locking rollers 34 and permits the drive to be effected, even though clutch 12 may still be engaged to continue the rotation of gear 18. The same is also true when a shift is made from second to high gear, clutch 13 may remain engaged until after the synchronizer has made its shift and when the fluid pressure connections are established to engage clutch 12 to establish the high, or direct gear drive, the transmission takes hold of the drive through the direct connection of the sleeve 20 to the propeller shaft, thus automatically releasing the locking rollers 32 of the free wheeling unit connection between the gear 28 and the shaft 29.

It will also be seen from the foregoing that the vehicle driven pump 66 acts as a speed responsive device and that in accordance with changes in vehicle speed, it will through the medium of the cylinder 70 and piston 71 actuate or set the differential lever to establish the proper gear ratio for driving conditions at any instant under the combined influence of vehicle speed and throttle opening. The combined action of the weights 60 and the hydraulic pressure upon the diaphragm 44 are such that although the clutch 12 operates primarily as a centrifugal clutch, its engagement is so affected by the hydraulic pressure that it is never caused to be engaged with a sudden jerky motion. The construction is such that the release springs 47 may be of such strength as to permit the weights 60 to reach the stop 62 at engine idling speed without completely taking up the clutch plate clearance. When the engine is started and is operating at idling speed, the first thing that occurs, naturally, is for the weights 60 to move outwardly and take up the clearance or lost motion, so that as soon as the accelerator pedal is depressed to cause or permit fluid under pressure to flow through the conduit 35 to the pressure chamber 40 to exert hydraulic pressure upon diaphragm 44, the clutch 12 is then caused to be engaged. The rate of clutch application is then controlled hydraulically but the weights 60 limit the pressure in accordance with the speed of the engine. The combined action of the hydraulic pressure and the centrifugal action of the weights is such that the hydraulic reaction member, namely the diaphragm 44, can be released to release the clutch for making shifts at speeds above the engaging speed of the centrifugal actuating means. The hydraulic pressure, however, may be applied as soon as the engine starts, the release springs 47 then being of such strength as to prevent the weights 60 from engaging the clutch at idle speed. In this case the diaphragm acts as a reaction member and the starting action of the clutch is controlled entirely by the centrifugal action, the hydraulic means acting primarily to release the clutch 12 for shifting and also as a safety device to prevent the centrifugal force, which becomes very great at high speeds from building up destructive forces in the mechanism.

A transmission constructed in accordance with the present invention has the following advantageous features. The employment of a vehicle driven pump which is caused to be rotated at a speed consonant with the speed of the vehicle and the pressure of the fluid delivered by said pump being employed to actuate one side of the differential lever 73 through the fluid pressure cylinder 70 and piston 71 enables the vehicle driven pump to be employed in lieu of a speed governor. The resulting construction is therefore not only less expensive than when a speed governor is employed, but is more compact. In addition it enables the fluid delivered by the vehicle pump to be employed when the vehicle is towed for starting the engine through the same fluid pressure system as used for the fluid delivered by the engine driven pump.

The fluid pressure cylinder 70 and piston 71 constitutes in effect a fluid pressure speed indicative device, the position of the piston 71 within the cylinders 70 at any instant corresponding to a definite speed. The provision of the several ports 70-a with the port 70-d of larger area located above the port 70-a insures that the piston 71 will never be raised to a greater extent than is necessary to move the valve 82 upwardly to an amount sufficient to establish communication of fluid under pressure from the conduit 79 to the conduit 116 leading to the selector valve.

The arrangement of the weights 60 and their connection to the pressure ring 45 and so that the application of the clutch 12 is produced by the combined effect of pressure within the pressure chamber 40 insures a highly efficient graduated application of the clutch 12 compensated for varying load, torque and speed conditions.

The springs 47-c are perferably made of such strength that the centrifugal force exerted by the weights 60 is not sufficient, when the engine is running at idling speed, to overcome the resistance of such springs and thereby apply the clutch. When, however, the accelerator pedal is depressed to open the throttle of the engine, fluid under pressure is admitted to the chamber 40 to move the diaphragm and pressure ring 45 until the latter has taken up the clearance provided and the ring 45 has moved into engagement with the nets 46-a. At the same time the speed of the engine is increased because of the opening of the throttle until when the engine has reached a speed slightly greater than idling speed, the weights 60 are then capable of exerting, under the action of the centrifugal force, a pull upon the rods 47 sufficient to overcome the resistance of spring 47-c and apply the clutch 12 with a comparatively light clutch pressure. Although this pressure is sufficient to impart drive, the conditions are equivalent to those effected by a skillful driver in slipping the clutch for parking or other maneuvers. As the accelerator pedal is still further depressed and the speed of the engine is increased, the centrifugal force imparted to the weights 60 increases until the weights 60 exert a pull upon the rods 47 sufficiently great to force the members of the clutch 12 more tightly into engagement and so that further clutch slippage can no longer occur. If at any time the pressure exerted by the weights 60 exceeds the resistance offered by the pressure of the fluid within the chamber 40 against the diaphragm 44, such pressure will tend to move the ring 45 and diaphragm 44 towards the left, thereby squeezing the fluid under pressure out of the chamber 40 and back into the fluid pressure conduit. The result is that at no time can the clutch pressure be greater than the pressure exerted by the fluid on diaphragm 44, nor can the fluid pressure alone produce application or engagement of the clutch. The clutch pressure, in the last analysis, therefore is determined and governed by the force exerted by the weights 60 due to the centrifugal effects until the engine speed has increased to a point such that the centrifugal force on the weights 60 would tend to produce a clutch pressure greater than the resistance offered by the fluid under pressure within the chamber 40.

As it is a characteristic of devices, wherein weights are caused to be moved under centrifugal forces, for the weights to fly out suddenly, which in a centrifugal clutch tends to produce jerky clutch action, the rate of clutch application in the present invention is controlled by governing the rate at which the fluid under pressure is admitted into the pressure chamber 40, this being accomplished by the use of a restricted orifice or jet in the fluid pressure line leading to the fluid pressure chamber 40; the orifice in the present case being specifically the restricted orifice 91-a provided in the plug 91 of the pressure control valve. It will thus be seen that by suitable calibration of the springs 47-c and orifice 91-a the clutch pressure exerted on clutch 12 at relatively low engine speeds is governed by the centrifugal force exerted by the weights 60, while the rate of clutch application is governed by the rate at which the fluid under pressure is permitted to flow into the chamber 40. It will further be seen that by suitable adjustment of the nuts 46-a and 47-b and positioning of the stop 62, the clutch may be caused to be engaged with sufficient pressure for positive non-slipping drive solely by the action of the centrifugal weights 60 or solely by the pressure admitted into the chamber 40. In the latter case, therefore, the centrifugal effects may be employed for full clutch application when the car is in low gear and the hydraulic pressure relied upon for positive clutch application when the transmission is in the higher gear ratio.

It will be understood that the construction and arrangement whereby the clutch 12 may be actuated under the combined influence of the centrifugal force of the weights 60 and the hydraulic pressure within the pressure chamber 40 is such that the manner in which the clutch is caused to function may be varied as desired by simple adjustments of the nuts 46-a and 47-b. For example, these nuts may be so adjusted that when fluid is initially admitted to the chamber 40 for starting purposes, although it will distort the diaphragm 44 and move the ring 45 to the right, the amount of motion so produced will not be sufficient to apply the clutch, but merely sufficient to enable the diaphragm 44 to act as a reaction member for the weights 60 and so that when the engine reaches a pre-determined speed of rotation, the engagement of the clutch for starting the vehicle will be produced primarily by the centrifugal action of the weights 60. After the vehicle is started, the clutch is then caused to be released and re-engaged for effecting the gear shifts by releasing and re-applying the pressure of the fluid within the chamber 40. Again by suitable adjustment the clutch pressure may be limited by the centrifugal action and the rate of clutch application established by hydraulic action, or alternatively the clutch may be employed primarily as a centrifugal clutch with a hydraulic lock-up.

It will be noted that when the synchronizer unit 20 is engaged with the gear 18, 18-a with clutch 12 in engagement for direct drive the provision of the one-way drive overrunning or free wheeling clutch 34 between gear 33 and sleeve 26 on countershaft 25 prevents drive from being imparted back from the gear 23 to the gear 22 thereby avoiding the driving of these gears and clutch 13 at high speeds when direct drive is effected, thus obviating objectionable noise and heating effects.

Due to the fact that the valve 104 is connected with fluid pressure conduit 35 by the branch conduit 35-a, fluid under pressure will always be admitted to the left hand end of the valve 104 whenever fluid under pressure is present in conduit 35 and pressure chamber 40 to apply clutch 12, and as a result valve 104 will always be moved to the right to connect both sides of cylinder 105 through conduits 110 and 111 respectively with conduits 104-a and 104-b leading to the sump. Consequently the synchronizer piston 105 can never be actuated to shift the synchronizer sleeve 20 whenever clutch 12 is engaged thus preventing the synchronizer from being disconnected under load with a resultant objectionable jerk or attempting to engage under load with objectionable gear clashing.

It is further to be noted that whenever, under the first arrangement described, pilot valve 82 is moved upwardly to permit fluid under pressure to flow into conduit 116 and thereby move the selector valve to the direct drive position such fluid will always be simultaneously admitted through branch 116-c to move valve 103 to the right and thus shut off the flow of fluid from conduit 79-b to conduit 79-d and thence to the left hand side of cylinder 105 while at the same time permitting fluid to flow from conduit 79-c to conduit 79-e and thence to the right hand end of cylinder 105 to move the synchronizer sleeve 20 to the left and connect it with gear 18, while under the alternative arrangement described such movement of the synchronizer sleeve 20 is controlled by the position of pilot valve 81.

From the foregoing description and by reference to the drawing, it will also be seen that speed changes are effected under the differential influence of throttle position (through the action of the accelerator pedal 100, sliding plug 90, rod 90-a and collar 90-b pressing the right hand end of differential lever 73 downwardly) and vehicle speed (through the action of the spring loaded piston 71 and piston rod 72 pulling the left hand end of differential lever 73 downwardly). The position of piston 72 at any instant, however, is determined by the pressure built up by forcing a quantity of oil proportional to vehicle speed from the vehicle driven pump 66 through a jet or jets (70-a), the area of which are so proportioned to the output of the pump 66 at different speeds that for any given vehicle speed there is a corresponding pre-determined position of the piston 71 and left hand end of the differential lever. Due to the spacing or clearance between the collars 90-b or rod 90-a the shifts from lower to higher speeds (when accelerating), however, will occur at different throttle positions and/or speeds than shifts from higher to lower speeds (when decelerating) as will be readily understood.

Attention is directed to the fact that, although both of the pumps 65 and 66 are connected to the conduit 79, the connections are such that fluid delivered by either pump in no way effects the operation of the other for whenever the engine pump 65 is rotating at a speed sufficient to deliver fluid at an effective operative pressure, the fluid which it delivers will close the ball check valve 77-c and force piston 77 downwardly an amount sufficient to close the connection of conduit 69-a; any fluid which may be delivered by pump 66 at the same time being relieved through the jets 70-a.

The provision of the overrunning clutches 32 and 34 whereby speed changes from lower to higher gear ratios, as hereinbefore described, insures that the automatic speed changes from a lower to higher gear will occur smoothly and evenly without objectionable jerking effects and without necessitating the use of complicated valving arrangements.

The arrangement of the transmission gearing per se with the overrunning one way clutches and the engagement of the synchronizer unit 20 with the gear 18, 18-a for second speed and high or direct gear drives, in accordance with the alternative arrangement described, results in the synchronizer unit 20 remaining coupled to the gear 18 during most of the ordinary driving conditions during which shifts are made more frequently from second speed to direct drive and vice versa.

The arrangement whereby the synchronizer is shifted into engagement with the gear 28, 20-a only when the pedal 126 is manually depressed results in second drive being imparted through the transmission gearing by the movement of the vehicle to the engine through the clutch 13 for using the engine as a brake.

While I have shown and described a satisfactory constructional example, it will be understood that many changes, variations and modifications in the specific constructional details thereof may be resorted to without departing from the spirit of the invention as set forth in the claims hereunto appended.

I claim:

1. In a fluid pressure operated automatic transmission for a self-propelled vehicle having an engine, torque requirement indicating means, fluid pressure actuated clutch means, a plurality of gear trains of different gear ratios certain of said gear trains being driven by said clutch means, means for supplying fluid under pressure to said clutch means, a pump driven in accordance with vehicle speed and vehicle speed indicating means operated thereby, a main control lever of differential effect, connections between said control lever and torque requirement indicating means and between said lever and said vehicle speed indicating means to vary the position of said lever, fluid pressure operated selector means operating under the control of said lever for automatically selecting the gear train to be effective at any instant, a fluid pressure control valve operated by said torque requirement indicating means to vary the pressure of the fluid delivered to said clutch means and manually operated means for setting and holding said lever and pressure control valve in a position such as to render a gear train of predetermined ratio and said clutch means therefor effective irrespective of the position to which said lever and valve would otherwise be set by automatic operation.

2. In a transmission for a self-propelled vehicle having an engine and a main driven propeller shaft, a pair of clutches, a plurality of gear trains of different gear ratios interposed between said engine and said shaft driven by said clutches, a synchronizer unit in driving relationship with said shaft and shiftable from an inoperative to an operative position, means for automatically engaging one of said clutches for effecting drive to said propeller shaft through said synchronizer when it is in said operative position and means for automatically engaging the other of said clutches to effect drive around said synchronizer to said propeller shaft through a gear train of different gear ratio without moving said synchronizer from its said operative position.

3. In a fluid pressure operated automatic transmission for a self-propelled vehicle having an engine and a main driven propeller shaft, a pair of fluid pressure actuated clutches, two driving connections of higher and lower speed ratios interposed between one of said clutches and said shaft, a driving connection of intermediate gear ratio between the other of said clutches and said shaft, a synchronizer unit shiftable from an inoperative to an operative position to render said driving connection of higher speed ratio effective and means for automatically engaging and disengaging either of said pair of fluid pressure actuated clutches to effect drive to said shaft through either said higher ratio or said intermediate ratio in accordance with variations in vehicle speed and torque requirements in the higher speed ranges of said vehicle without moving said synchronizer unit from its said operative position.

4. In a transmission for a self-propelled vehicle having an engine and a main driven propeller shaft, a pair of clutches, two driving connections of higher and lower speed ratios interposed between one of said clutches and said shaft, a driving connection of intermediate ratio between the other of said clutches and said shaft, a synchronizer unit in driving relationship with said shaft and shiftable from neutral position to either of two operative positions, means for automatically engaging said one clutch to effect drive through said lower ratio to said propeller shaft when said synchronizer unit is in neutral position and means for automatically engaging said other clutch in accordance with variations in vehicle speed and torque requirements to effect drive through said intermediate ratio when said synchronizer unit is held in its neutral position and to engage said one clutch when said synchronizer unit is in one of its said operative positions to effect the driving engagement of higher speed ratio between said one clutch and said shaft.

5. In a fluid pressure operated automatic transmission for a self-propelled vehicle having an engine and a main driven propeller shaft, a pair of fluid pressure actuated clutches, two driving connections of higher and lower speed ratios interposed between one of said clutches and said shaft, a driving connection of intermediate ratio between the other of said clutches and said shaft, a synchronizer unit in driving relationship with said shaft and shiftable from a neutral position to an operative position, means for automatically engaging said one clutch to effect drive through said lower ratio to said propeller shaft when said synchronizer unit is in neutral position and means for automatically engaging said other clutch in accordance with variations in vehicle speed and torque requirements to effect drive through said intermediate ratio when said synchronizer unit is in its neutral position and to engage said one clutch when said synchronizer unit is in its said operative positions to effect the driving engagement of higher ratio between said one clutch and said shaft, fluid pressure means for automatically effecting engagement of said pair of clutches, valve means operated in accordance with various combinations of vehicle speeds and torque requirements for controlling the actuation of said fluid pressure means to effect a shift from said higher ratio to said intermediate ratio and vice versa without moving said synchronizer unit from its said operative position.

6. In a transmission for a self-propelled vehicle having an engine and a main driven propeller shaft, a pair of clutches, two driving connections of higher and lower ratios interposed between one of said clutches and said shaft, a driving connection of intermediate ratio between the other of said clutches and said shaft, a synchronizer unit in driving relationship with said shaft and shiftable from neutral position to either of two operative positions, means for automatically engaging said one clutch to effect drive through said lower ratio to said propeller shaft when said synchronizer unit is in neutral position and means for automatically engaging said other clutch in accordance with variations in vehicle speed and torque requirements to effect drive through said intermediate ratio when said synchronizer unit is in its neutral position and to engage said one clutch or when said synchronizer unit is in one of its said operative positions to effect the driving engagement of higher ratio between said one clutch and said shaft, and manually operated means for effecting a shaft of said synchronizer unit to its other said operative position and for simultaneously connecting said other clutch to establish the intermediate ratio connection between said engine and said shaft irrespective of said variations.

7. In a fluid pressure operated automatic transmission for a self-propelled vehicle having an engine and a main driven propeller shaft, a pair of independently engageable and releasable fluid pressure actuated clutches, a countershaft, a gearing connection between said countershaft and said propeller shaft including a one way free wheeling clutch, a gearing connection of low speed drive between one of said fluid pressure actuated clutches and said countershaft including a second one way free wheeling clutch, and a gearing connection with said countershaft of intermediate speed ratio engaged by the other of said fluid pressure actuated clutches independently of said first fluid pressure actuated clutch.

8. In a transmission for a self-propelled vehicle having an engine and a main driven propeller shaft, a pair of clutches, a countershaft, a gearing connection between said countershaft and said propeller shaft including a one way free wheeling clutch, a gearing connection for low gear drive between one of said pair of clutches and said countershaft including a second one way free wheeling clutch, a gearing connection for intermediate gear drive between the other of said pair of clutches and said countershaft, a synchronizer unit for effecting a direct driving connection between said engine and propeller shaft through said one of said pair of clutches, and means for automatically effecting engagement of said pair of clutches and said synchronizer unit in accordance with variations in vehicle speed and torque requirements.

9. In a transmission for a self-propelled vehicle having an engine and a main driven propeller shaft, a countershaft, a gearing connection between said countershaft and said propeller shaft, a pair of clutches driven by said engine, a gearing connection for low gear drive between one of said clutches and said countershaft including a one way free wheeling clutch connection, a gearing connection for intermediate gear drive directly connecting the other of said clutches with said countershaft, a synchronizer unit for effecting a connection for higher gear drive between said one clutch and said propeller shaft, a one way free wheeling clutch interposed between said propeller shaft and the gearing connection thereto from said countershaft whereby when the gearing connection for higher gear drive is rendered effective through said synchronizer unit and said one clutch, said last mentioned one way clutch will be automatically released; whereby when low gear drive is effected through said one clutch drive is transmitted from said engine to said propeller shaft through both of said one way free wheeling clutches; and whereby when drive is effected through the other of said pair of clutches the second of said one way clutches is automatically released and drive is transmitted through said countershaft and said first one way clutch to said propeller shaft.

10. In a transmission for a self-propelled vehicle having an engine and a main driven propeller shaft, a countershaft, a gearing connection between said countershaft and said propeller shaft, a pair of clutches driven by said engine, a gearing connection for low gear drive between one of said clutches and said countershaft including a one-way free wheeling clutch connection, a gearing connection for intermediate gear drive directly connecting the other of said clutches with said countershaft, a synchronizer unit for effecting a connection for higher gear drive between said one clutch and said propeller shaft, a one-way free wheeling clutch interposed between said propeller shaft and the gearing connection thereto from said countershaft whereby when the gearing connection for higher gear drive is rendered effective through said synchronizer unit and said one clutch, said last mentioned one-way clutch will be automatically released; whereby when low gear drive is effected through said one clutch drive is transmitted from said engine to said propeller shaft through both of said one way free wheeling clutches; and, whereby when drive is effected through the other of said pair of clutches the first of said one way clutches is automatically released and drive is transmitted through said countershaft and said second one-way clutch to said propeller shaft, and manually operated means for effecting a shift of said synchronizer unit to connect said propeller shaft directly to said first named gearing connection and simultaneously to the other of said pair of clutches whereby driving connection will be established from said propeller shaft to said engine to cause said engine to be driven by rotation of said propeller shaft.

11. In a fluid pressure operated automatic transmission for a self-propelled vehicle having an engine and a main propeller shaft, a fluid pressure pump driven in accordance with engine speed, a second fluid pressure pump driven in accordance with vehicle speed, gear trains of different gear ratio interposed between said engine and said propeller shaft, a fluid pressure actuated clutch for connecting certain of said gear trains to said engine and said propeller shaft, control means for directing fluid under pressure from either of said pumps to said clutch and connections between said control means and the delivery conduits of said pumps including valve means connected across said delivery conduits to automatically shut off the communication of said vehicle driven pump with said control means when said engine driven pump is operative and to establish such communication when said engine driven pump is inoperative.

12. In a change speed transmission for a self-propelled vehicle having an engine and a driven propeller shaft, a pair of separately engageable and releasable clutches adapted to be alternatively and independently driven by said engine, a pair of continually meshed gear trains one for low speed drive adapted to be driven by one of said clutches and the other for higher speed drive adapted to be driven by the other of said clutches, driving connections between said gear trains and propeller shaft and a one-way drive, free wheeling unit interposed between said gear trains whereby when drive is transmitted to said propeller shaft through said gear train for higher speed drive said free wheeling unit will be automatically released to prevent said lower speed drive train and its clutch from being driven at high idling speeds.

13. In a fluid pressure operated automatic transmission for a self-propelled vehicle having an engine and a main driven propeller shaft, a pair of fluid pressure actuated clutches, a plurality of gear trains of different gear ratios interposed between said engine and said shaft driven by said clutches, a synchronizer unit in driving relationship with said shaft and shiftable to an operative position wherein drive is established through one of said clutches and said synchronizer unit, a fluid pressure pump and connections therefrom to said clutches, a selector valve for alternately directing fluid under pressure from said pump through said connections alternately to said clutches, fluid pressure actuated means for shifting said synchronizer to connect one of said gear trains to said propeller shaft and means to prevent shifting of said synchronizer when fluid under pressure is being delivered to the clutch in driving relationship with said propeller shaft through said synchronizer.

14. In a fluid pressure operated automatic transmission for a self-propelled vehicle having an engine, a propeller shaft and a plurality of automatically engageable reduction gear trains of different ratios interposed therebetween, a pair of clutches for establishing drive through said gear trains, a shiftable synchronizer unit for converting the drive through one of said clutches to either a forward reduction drive or a two-way direct drive, and one-way drive means interposed in said gear trains in a manner whereby each successively higher speed drive ratio may be established without releasing the clutch associated with the next lower speed drive.

15. A fluid pressure operated automatic transmission as set forth in claim 14 wherein three progressive forward speeds may be automatically effected by the alternate engagement of the respective clutches and the shifting of said synchronizer unit.

16. In an automatic transmission for a self-propelled vehicle having an engine and a main driven propeller shaft, a low speed gear train including two one-way clutches, an intermediate speed gear train including one of said one-way clutches, a shiftable synchronizer unit adapted for use in establishing direct two-way drive between said engine and propeller shaft and a pair of clutches adapted upon alternate engagement and the shifting of said synchronizer unit to establish said low, intermediate and direct drive trains, said one-way clutches being adapted to permit successive drive trains to be established without necessitating the release of the clutch associated with the next preceding gear train, and said synchronizer unit being adapted to be shifted to and away from its direct drive position during a period when the clutch associated with direct drive is not occupied in transmitting drive.

17. In a fluid pressure operated automatic transmission for a self-propelled vehicle having an engine, a propeller shaft and a plurality of drive trains of different ratios interposed therebetween, a pair of clutches for establishing drive progressively through said trains, a shiftable synchronizer adapted to render one of said clutches operative in transmitting drive in either of two ratios, one-way drive means interposed in said trains in a manner whereby drive through one of said clutches may be transferred to the other of said clutches without releasing said one clutch, and wherein interlock means is provided to prevent the shifting of said synchronizer unit while the mentioned two ratio clutch is engaged.

18. In a self-propelled vehicle having an engine, a shaft driven at engine speed, and a propeller shaft, a pair of clutches and transmission gearing interposed between said engine driven and propeller shafts for effecting two gear trains of different reduction ratios, said gearing including one-way drive means whereby upshifts from the relatively low speed reduction train to the higher speed reduction train may be effected while the clutch associated with said low speed train remains engaged, a synchronizer unit shiftable when said low speed clutch is idle and adapted to provide direct two-way drive when said latter clutch is re-engaged, and one-way drive means in said higher speed reduction train whereby upshifts therefrom to said direct drive may be effected while the clutch associated with the reduction train remains engaged.

19. In a fluid pressure operated automatic transmission for a self-propelled vehicle having an engine, a throttle therefor and throttle actuating means, a plurality of power trains of different ratios, a plurality of fluid pressure actuated engaging means for selectively and gradually rendering said power trains operative, means for delivering fluid under pressure to said engaging means including a pump driven in accordance with engine speed and a second pump driven in accordance with vehicle speed, means differentially responsive to said throttle actuating means and the output of said second pump for automatically selecting the power train to be effective for driving said vehicle in accordance with varying torque requirement and vehicle speed, a fluid pressure control valve for regulating engagement pressure actuated by said throttle actuating means, and manually operated means for modifying the effective operation of said differential means and said pressure control valve to render a different power train and engagement pressure effective than would otherwise be automatically established.

20. In a fluid pressure operated automatic transmission for a self-propelled vehicle having an engine, a throttle therefor and throttle actuating means, a plurality of power trains of different ratios, selectively operable fluid pressure actuated power train engaging means for effecting a change in power train, automatic control means for effecting a selection of power train in accordance with variations in vehicle speed and said throttle actuating means, a source of fluid pressure for actuating said power train engaging means, a pressure control valve responsive to changes in said throttle actuating means for modifying said fluid pressure, and manually operated means for establishing a selection of power train and effective pressure for said power train engaging means other than established under said automatic controls.

21. In a transmission for a self-propelled vehicle having an engine and a main-driven propeller shaft, a plurality of power trains of different ratios interposed between said engine and said shaft, gradually engageable members for selectively establishing drive through said power trains, a positive clutch in driving relationship with said shaft and shiftable from a nontransmitting to a drive transmitting position, means for automatically engaging one of said members for effecting drive to said propeller shaft through said positive clutch when it is in said transmitting position, and means for automatically releasing said one and engaging the other of said members to effect drive of different ratio by-passing said positive clutch without moving said positive clutch from said transmitting position.

22. In an automatic transmission for a self-propelled vehicle having an engine and a main-driven propeller shaft, a low-speed power train between said engine and said shaft, gradually engageable means for establishing drive through said power train, an intermediate speed power train, gradually engageable means for establishing drive through said latter power train, a positive clutch shiftable from a nontransmitting to a drive transmitting position, a third power train rendered effective by the engagement of said first means when said positive clutch is in said transmitting position, and means for automatically shifting between said third and intermediate speed drives through actuation of said gradually engageable means without moving said positive clutch from its said transmitting position.

23. In a transmission for a self-propelled vehicle having an engine and a main driven propeller shaft, a plurality of gearing connections between said engine and said propeller shaft including a common one-way free-wheeling clutch, one of said gearing connections for a low-speed drive including a second one-way free-wheeling clutch, gradually engageable means for establishing said low-speed drive, a second of said gearing connections for an intermediate speed drive by-passing said second one-way clutch, gradually engageable means for establishing said intermediate-speed drive, a positive clutch shiftable to effect a third-speed driving connection between said engine and propeller shaft by-passing both one-way clutches when said first means is engaged, and automatic controls for effecting engagement of both said means and shifting of said positive clutch to establish progressive speed drives.

24. In a fluid pressure operated automatic transmission for a self-propelled vehicle having an engine and a propeller shaft, a fluid pressure pump driven in accordance with engine speed, a second fluid pressure pump driven in accordance with vehicle speed, fluid pressure actuated power train engaging means for establishing drive between said engine and said propeller shaft, control means for establishing communication between fluid under pressure from either of said pumps with said power train engaging means, said control means including valve means to automatically shut off communication of said vehicle driven pump with said power train engaging means when said engine is running and said engine driven pump is therefore operative to deliver fluid under pressure and valve means to establish said communication when said vehicle is moving with the engine not running and said engine driven pump is therefore inoperative.

25. In a fluid pressure operated automatic transmission for a self-propelled vehicle having an engine and a main-driven propeller shaft, a plurality of power trains of different ratio interposed between said engine and said shaft, a plurality of fluid pressure operated gradually engageable units for establishing drives of different ratios, a positive clutch shiftable to a drive transmitting position wherein drive may be completed through engagement of one of said gradually engageable units, a source of fluid pressure, selector means for controlling fluid pressure for actuating said units, fluid pressure means for shifting said positive clutch to said drive transmitting position, and interlock means to prevent such shifting of said positive clutch except when the associated gradually engageable unit is released.

26. In a fluid pressure operated automatic transmission for a self-propelled vehicle having an engine, a throttle, throttle actuating means and a propeller shaft, gradually engageable fluid pressure actuated means for effecting drive between said engine and propeller shaft, a source of fluid pressure for actuating said means, a pressure control valve for modifying the pressure available from said source, said valve being responsive to movement of said throttle actuating means, and means responsive to engine speed for limiting the effective engagement of drive.

27. In a fluid pressure operated automatic transmission for a self-propelled vehicle having an engine, a propeller shaft, and a plurality of power trains of different ratios interposed therebetween, a plurality of gradually engageable units for progressively establishing drive through said power trains, a shiftable positive clutch adapted to convert drive transmitted by one of said units between either of two ratios, fluid pressure means for engaging said unit, fluid pressure means for shifting said positive clutch and automatic means for controlling the engagement of said unit and the shifting of said clutch including interlock means to prevent the shifting of said clutch except when said two-ratio unit is released.

28. In a self-propelled vehicle having an engine and a propeller shaft, a pair of power trains between said engine driven and propeller shafts for effecting drives of different ratios, a pair of gradually engageable units for progressively effecting drive through said power trains upon successive engagement, one-way drive means interposed in said power trains in a manner whereby a shift from drive through one unit in one ratio may be made to another ratio by the simple engagement of the second unit, a positive clutch shiftable to an operative position when said one unit is released and adapted to provide a third-speed power train upon the reengagement of such unit, and one-way drive means whereby a shift to said third speed may be effected while the unit associated with the prior power train remains engaged.

WILLIAM T. LIVERMORE.

REFERENCES CITED

The following references are of record in the file of this patent:

UNITED STATES PATENTS

| Number | Name | Date |
|---|---|---|
| 1,443,591 | Richardson | Jan. 30, 1923 |
| 2,058,736 | Stauffer et al. | Oct. 27, 1936 |
| 2,102,781 | Bieretz | Dec. 21, 1937 |
| 2,120,104 | Livermore | June 7, 1938 |
| 2,133,548 | Lassiter | Oct. 18, 1938 |
| 2,163,202 | Kegresse | June 20, 1939 |
| 2,183,761 | Aspinwall et al. | Dec. 19, 1939 |
| 2,184,941 | Maroto | Dec. 26, 1939 |
| 2,193,267 | Burtnett | Mar. 12, 1940 |
| 2,193,305 | Thompson | Mar. 12, 1940 |
| 2,195,365 | Getaz | Mar. 26, 1940 |
| 2,210,237 | Fuhrer | Aug. 6, 1940 |
| 2,212,740 | Iavelli | Aug. 27, 1940 |
| 2,247,478 | Burtnett | July 1, 1941 |
| 2,282,949 | Dolza | May 12, 1942 |
| 2,302,312 | Greenlee | Nov. 17, 1942 |
| 2,376,545 | Livermore | May 22, 1945 |
| 2,430,799 | Aspinwall | Nov. 11, 1947 |

FOREIGN PATENTS

| Number | Country | Date |
|---|---|---|
| 626,030 | Germany | Feb. 26, 1936 |